US009648589B2

(12) United States Patent
Weaver et al.

(10) Patent No.: US 9,648,589 B2
(45) Date of Patent: May 9, 2017

(54) MULTIPLE RADIO DEVICES FOR IMPLEMENTING DYNAMIC BAND ACCESS BACKGROUND

(75) Inventors: Geoff Weaver, Portland, OR (US); Carlos Cordeiro, Portland, OR (US); Srikathyayani Srikanteswara, Portland, OR (US); Bahareh Sadeghi, Portland, OR (US); Reza Arefi, Great Falls, VA (US); David Horne, Chandler, AZ (US); Takashi Shono, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 13/996,682

(22) PCT Filed: Jun. 6, 2012

(86) PCT No.: PCT/US2012/041167
§ 371 (c)(1),
(2), (4) Date: Mar. 31, 2015

(87) PCT Pub. No.: WO2013/154598
PCT Pub. Date: Oct. 17, 2013

(65) Prior Publication Data
US 2015/0245217 A1    Aug. 27, 2015

(51) Int. Cl.
*H04W 72/00* (2009.01)
*H04L 29/06* (2006.01)
(Continued)

(52) U.S. Cl.
CPC ......... *H04W 72/04* (2013.01); *H04L 41/0896* (2013.01); *H04W 4/24* (2013.01);
(Continued)

(58) Field of Classification Search
CPC ..... H04W 16/14; H04W 28/16; H04W 24/08; H04W 4/24; H04W 72/04;
(Continued)

(56) References Cited

U.S. PATENT DOCUMENTS 5,608,727 A    3/1997    Perreault et al.
7,269,151 B2   9/2007    Diener et al.
(Continued)

FOREIGN PATENT DOCUMENTS

| WO | 00/56099 A1     | 9/2000 |
| WO | 2007/031958 A2  | 3/2007 |
| WO | 2013/126087 A1  | 8/2013 |

OTHER PUBLICATIONS

International Search Report and Written Opinion received for PCT Application No. PCT/US2012/035748, mailed on Feb. 13, 2013, 9 pages.
(Continued)

*Primary Examiner* — Tammy Paige Goddard
*Assistant Examiner* — Frantz Bataille
(74) *Attorney, Agent, or Firm* — Ellis B. Ramirez; PRASS LLP (57) ABSTRACT

A system and method are provided to implement dynamic spectrum access with individual multi-mode devices that incorporate multiple radios in a single device. A multi-mode device is configured to make use of the incremental spectrum by maintaining a data communication link via a base station that is operated by a primary operator to support communications in the primary operator's exclusively-licensed spectrum. This data communication link is maintained by a first radio, the data communication link being used to support a first level of data communication as well as to signal an availability of additional spectrum to the multi-mode device. The multi-mode device may request
(Continued)

access to additional spectrum. A second radio may facilitate access to received additional spectrum with the multi-radio multi-mode device.

29 Claims, 4 Drawing Sheets

(51) Int. Cl.
    *H04W 4/00* (2009.01)
    *H04W 72/04* (2009.01)
    *H04W 16/14* (2009.01)
    *H04W 4/24* (2009.01)
    *H04W 24/08* (2009.01)
    *H04W 28/16* (2009.01)
    *H04L 12/24* (2006.01)
    *H04W 16/10* (2009.01)
    *H04W 72/12* (2009.01)
    *H04W 76/02* (2009.01)
    *H04W 74/00* (2009.01)
    *H04W 88/06* (2009.01)

(52) U.S. Cl.
    CPC ........... *H04W 16/10* (2013.01); *H04W 16/14* (2013.01); *H04W 24/08* (2013.01); *H04W 28/16* (2013.01); *H04W 72/0486* (2013.01); *H04W 72/0493* (2013.01); *H04W 72/1257* (2013.01); *H04W 74/002* (2013.01); *H04W 76/02* (2013.01); *H04W 88/06* (2013.01)

(58) Field of Classification Search
    CPC ......... H04W 72/0486; H04W 72/0493; H04W 76/02; H04W 88/06; H04W 16/10; H04W 72/1257; H04W 74/002; H04L 41/0896
    See application file for complete search history.

(56) References Cited

U.S. PATENT DOCUMENTS

| | | |
|---|---|---|
| 8,000,715 B2 | 8/2011 | Melpignano et al. |
| 8,073,458 B2 | 12/2011 | Chang |
| 2006/0083205 A1 | 4/2006 | Buddhikot et al. |
| 2006/0234691 A1* | 10/2006 | Dygert ................ H04B 1/0003 455/418 |
| 2007/0149187 A1 | 6/2007 | Levy |
| 2008/0108365 A1 | 5/2008 | Buddhikot et al. |
| 2008/0117869 A1 | 5/2008 | Freen et al. |
| 2008/0222021 A1 | 9/2008 | Stanforth et al. |
| 2009/0022405 A1 | 1/2009 | Griffin |
| 2010/0145745 A1 | 6/2010 | Stanforth et al. |
| 2010/0238868 A1 | 9/2010 | Melpignano et al. |
| 2010/0279680 A1 | 11/2010 | Reudink |
| 2010/0325551 A1 | 12/2010 | Lauwers et al. |
| 2011/0077042 A1 | 3/2011 | Stanforth et al. |
| 2011/0205984 A1 | 8/2011 | Lee et al. |
| 2012/0014332 A1* | 1/2012 | Smith ................... H04W 16/14 370/329 |
| 2013/0095806 A1* | 4/2013 | Salkintzis ............. H04L 65/601 455/414.3 |

OTHER PUBLICATIONS

International Search Report and Written Opinion received for PCT Patent Application No. PCT/US2012/035760, mailed on Jan. 24, 2013, 9 pages.
International Search Report and Written Opinion received for PCT Patent Application No. PCT/US2012/035780, mailed on Feb. 25, 2013, 10 pages.
International Search Report and Written Opinion Received for PCT Application No. PCT/US2012/041167, mailed on Jan. 2, 2013, 12 pages.
International Search Report and Written Opinion received for PCT Patent Application No. PCT/US2012/041169, mailed on Feb. 27, 2013, 9 pages.

* cited by examiner

MULTIPLE RADIO DEVICES FOR IMPLEMENTING DYNAMIC BAND ACCESS

BACKGROUND

This application claims priority to U.S. Provisional Patent Application No. 61/603,261, entitled "Intelligent Spectrum Allocation Based on User Behavior Patterns For Efficient Spectrum Usage." filed on Apr. 11, 2012. This application is related to co-pending Application Nos. PCT/US2012/035780, PCT/US2012/035760 and PCT/US2012/035748, filed Apr. 30, 2012, the disclosures of which are hereby incorporated by reference herein in their entirety.

BACKGROUND

1. Field of the Disclosed Embodiments

This disclosure relates to systems and methods that implement dynamic band access using a multi-mode device (MMD) containing multiple radios that provide access to spectrum allocated by primary spectrum holders (PSH's), or proxies assigned to manage a given allocations of spectrum, to temporarily "rent" access to the spectrum they hold to other entities such as, for example, operators of mobile wireless networks.

2. Related Art

The last decade and a half has witnessed an explosion in growth in the use of, and requirements for, wireless data communications, particularly by individual users operating, for example, through exclusively-licensed wireless network operators. This growth continues unabated today as the numbers and types of wireless devices employed by individual users to access all manner of wireless networks via various communication paths continue to multiply, increasing demand for available spectrum. As the increase in demand for wireless data access continues, the world is headed toward a global spectrum shortage. There is a finite amount of spectrum that can be tapped to support wireless data communication. Availability of wireless spectrum for the increasing numbers and types of wireless devices is key to the continued use of the spectrum to exchange data, and to continued economic growth.

An availability of ever increasingly-capable wireless data communications has also created in individual users an expectation of a certain quality of service. In short, individual wireless data communication consumers, for example, expect quality wireless data and voice communications to be available anytime and anyplace. If solutions are not found, users of certain MMD's will frustratingly experience increased instances of dropped calls and slow data speeds all while paying higher fees for access to the scarce resource that will be the wireless voice and data communication spectrum.

Wireless MMD's are used to provide individual customers virtually instantaneous and continuous wireless access to email, social media, applications and streaming video. These MMD's are estimated to use 25 to 125 times the amount of spectrum that was used by earlier generation cellular telephones. Various industry estimates expect growth in global mobile data traffic to double every 1-2 years for the foreseeable future.

Exclusive mobile spectrum licenses carve out to their licensees portions of the available spectrum that are used for wireless data and voice communication. Licensees in any geographic area include government agencies, which sometimes reserve communication spectrum to certain "required" wireless voice and data communications. A non-exhaustive list of these communications users includes broadcast radio and television communications, satellite communications, public safety and emergency services communications, military communications, and certain other commercial communication requirements to include, for example, communications with aircraft for navigation and air traffic control. Licensees in particular geographic areas also include wireless network operators such as, for example, mobile cellular network operators. A cursory review of a breakdown of the licensed spectrum for any particular geographic area reveals that the availability of new spectrum to support assignment of additional exclusive licenses to any particular licensee is nearly exhausted.

A detailed review of the challenges faced by mobile cellular network operators as an example starts with an overview of their operations. Mobile cellular network operators license spectrum bands for their exclusive use within a particular geographic region. These entities then contract with individual customers purchasing or being provided with network-connected MMD's to provide certain levels of service with express or implied guarantees of connectivity, and of communications fidelity at increasing rates of delivery. As mobile cellular network communication traffic continues its dramatic increase, congestion occurs today and the congestion is forecast to rise significantly in coming years in the portions of the spectrum currently licensed to mobile cellular network operators to support wireless voice and data communications.

In the face of current and forecast issues regarding network congestion in their licensed spectrums, wireless network operators have taken to purchasing additional exclusive spectrum licenses in the secondary market from other exclusive licensees (spectrum holders) whose licensed spectrum is underused or otherwise available. Buying additional spectrum licenses allows wireless network operators to build or expand their networks and handle more customer traffic. In fact, in late 2011, one major mobile cellular network operator in the U.S. reached an agreement, subject to regulatory approval, to buy a license for a small swath of wireless communication spectrum (around 20 MHz) from several broadcast cable companies for an amount that was reported to be in excess of three and one half billion dollars.

Efforts are ongoing to optimize wireless data communication to make more effective use of available spectrum. Consider the available spectrum as a pipe with a finite maximum diameter. Ongoing efforts attempt to optimize the flow of data through that pipe, thereby reducing the amount of spectrum used. These efforts include use of compression techniques, video optimization and burst transmissions such that overall data transmission through the pipe is streamlined and optimized, i.e., techniques are implemented to pass larger amounts of data in what appears to be a smaller volume of flow through the pipe. Additional efforts are focused on concepts such as Wi-Fi offload or small cell development to ease the burden on the saturated portions of the spectrum exclusively licensed to mobile cellular network operators. All efforts at making data flow more efficient, thereby improving spectral efficiency, will reap benefits. Regardless of these efforts, however, the pipe will never get any bigger due to the fixed, finite spectrum covered by licenses. The above efforts may delay the inevitable. There will still come a time, however, when currently-licensed portions of the spectrum that support mobile voice and data communications will be overburdened. When this overburdening occurs, a mobile cellular network operator has at its disposal methods, some of which are used today, by which to maintain service across its exclusively-licensed spectrum for all of its individual customer MMD's. Often these methods reduce the quality of service experienced by individual customers. Common techniques include, for example, mobile cellular network operators "throttling" rates at which data may be received by individual customers' MMD's. As with any supply and demand scheme, a wireless network operator can exact a premium from certain of its individual customers according to currently-licensed spectrum for its use to prioritize which individual customers get "throttled" last.

SUMMARY OF DISCLOSED EMBODIMENTS

A review of use of certain of the above-discussed licensed spectrums, other than those licensed to mobile cellular network operators, reveals that, although allocated to a specific entity for use at particularly scheduled times or on an as-needed basis, an overall rate of use of certain licensees' spectrum may actually be very low. The spectrum that is allocated to certain services, other than voice and data communication and Wi-Fi services, may experience actual overall average use rates as low as 1%. For example, some entities only require high use of their spectrum in times of emergency. Theoretically, across the wireless spectrum, up to an estimated 4 GHz of spectrum is underused.

One industry solution that has been suggested would be to allow individual MMD's to conduct autonomous spectrum sensing to detect unused spectrum and to tap into that spectrum for individual MMD's to use on an ad hoc basis. This "open market" or "opportunistic" method, which allows the individual customer to seek out and use the most effective and economical service regardless of how that service is delivered to the individual customer's MMD, is not according to the current paradigm. This method appears, according to current technology, to pose a level of chaos that will not solve the problem in a disciplined enough manner to be viable. Often, spectrum holders whose spectrum may be accessed require full control of their spectrum at certain times without interference from encroaching MMD's. The spectrum sensing solution would disrupt such control and introduce interference. There may come a time when an open market method may be feasibly implemented. At that time, the systems and methods according to this disclosure may be implemented directly with individual MMD's.

Some have suggested that the allocation of spectrum should implement utility models based on fairness, content type, and differences in providers. This suggested solution is largely discounted as it is postulated to create fragmentation and lead to inefficiencies that would only exacerbate the currently-forecast difficulties. Others have suggested using cognitive pilot channels (wireless spectrum) to advertise available unused or underused spectrum. This "solution," however, would require use of additional spectrum to implement the advertising and would be largely uncontrolled leading to increased chaos. Use of static databases to locate unused spectrum has also been proposed, but is not considered dynamic enough to manage the problem longer term. Spectrum required by individual users for any given period in any given location is dynamically changing, particularly when the users are mobile. This calls for an equally dynamic automated solution by which to manage spectrum allocation. The problems of overcrowding in certain portions of the spectrum can be alleviated by executing a disciplined scheme to tap into the underused portions of the spectrum in a manner that meets the requirements of all of the respective licensees.

In contrast to the open market method described above is a "controlled market" method. The controlled market method is based on the mobile cellular network operator/individual customer model in place today. An individual customer does not generally access spectrum except through the licensed spectrum controlled by the mobile cellular network operator that provides the service and equipment (MMD) to the individual customer. It is in this model that the mobile cellular network operator provides a contracted-for level of service with certain guarantees and disclaimers, while exercising some level of control. For example, based on this relationship, the mobile cellular network operator can throttle an individual customer's access to wireless communications by slowing the rate at which those communications are provided to the individual customer's MMD. The mobile cellular network operator could also block data transmissions from reaching the individual customer's MMD. The mobile cellular network operator can also control what applications individual customers may be able to access, and what applications the individual customers' MMD's may support. Because the controlled market method is the method generally in place today, the balance of this disclosure will appear to make reference to implementation of the disclosed systems and methods in a controlled market. It should be recognized, however, that the systems and methods according to this disclosure, as indicated above, may be equally enabled in an open market method, if an open market method becomes the paradigm for supporting individual customers' wireless communication needs. Also, the term mobile cellular network operator is used to generically refer to any commercial provider that exclusively licenses spectrum in support of providing wireless data and voice communications to a number of individual users on a for-fee basis.

Based on the above shortfalls, a new paradigm is emerging for global spectrum optimization in a controlled environment. New to the wireless industry is a discussion of temporary spectrum license rental/leasing, as opposed to spectrum license sale. This rental/leasing of temporary access to spectrum availability may be undertaken via auction or secondary market transactions. Exclusive licensees of unused or underused spectrum, referred to here as PSH's may provide an amount of spectrum at a particular time, in a particular location, and in a particular frequency band, to the marketplace in which licensees that require additional spectrum may acquire temporary access to the offered spectrum for a monetary fee or other appropriate consideration. There is a worldwide push for regulations that allow licensed spectrum holders to temporarily transfer, e.g. rent or lease, access to their unused or underused spectrum to other entities requiring spectrum such as mobile cellular network operators. This creates a win-win situation where the other entities gain access to additional spectrum resources, which would not otherwise be available, while the PSH's with unused spectrum get a financial incentive or other consideration. This may be particularly attractive to the large majority of licensed spectrum holders whose use of their spectrum is well less than 100%, but that are not able to relinquish the spectrum completely through sale or other transaction based on their need to keep the spectrum reserved to their own use in certain areas at certain times.

According to proposed schemes, multiple PSH's having underused spectrum may act as spectrum suppliers. Multiple alternate spectrum holders (ASH's), such as, for example, mobile cellular network operators, may seek to augment their own exclusively-licensed spectrum by obtaining additional spectrum availability from the spectrum suppliers as, for example, spectrum renters. The mobile cellular network operator needs to support its individual customers operating its individual MMD's connected to the mobile cellular network. The mobile cellular network operator is in a position to monitor the use of its network by its individual customers according to time and location. When the mobile cellular network operator determines that its licensed spectrum will not meet customer demand for a particular location at a particular time, e.g., busiest periods of the day, the mobile cellular network operator, acting as an ASH, may execute a transaction such as, for example, placing a real-time bid for spectrum, to temporarily acquire additional spectrum in a particular location at a particular time that has been made available by a PSH in a controlled marketplace.

Prior to offering portions of its underused spectrum to the marketplace for access by potential ASH's, the PSH generally needs to be assured that it can regain control of its spectrum when a need arises. A clear mechanism to support such assurances is provided in the exemplary embodiments discussed in this disclosure. As discussed in this disclosure, DSA generally refers to a scheme that allows PSH's to temporarily rent their spectrum to ASH's on the condition that the rented spectrum can be reclaimed by the PSI on demand. It is estimated that, through implementation of such a scheme across all spectrum to 6 GHz, as much as 75% of the underused 4 GHz of spectrum may be recovered for use by multiple ASH's. This complete recovery would require full implementation of a brokering scheme and full cooperation from all PSH's. Actual implementation may initially realize a recovery of spectrum at well less than 2 GHz as it is anticipated that certain PSH's may choose not to participate, and others may temper their participation. To put the above numbers in some perspective, however, it should be realized that a 500 MHz recovery would effectively double the amount of spectrum currently available for mobile cellular network communications.

A challenge in achieving an efficient and scalable DSA scheme that becomes economically viable is effective spectrum management. In other words, given the temporary lease of spectrum to different operators or users, in different locations, for different time periods, a challenge resides in determining how best to coordinate the lease of the spectrum so that the brokering scheme maximizes: (1) the incentive for ASH's; (2) the incentive for PSI's and (3) experience for the user/operator that is paying for that spectrum (ideally, with minimal cost), all while avoiding interference and assuring the PSH that its spectrum is recoverable on demand. This is an optimization problem that lends itself to use of computational analytics. Currently, there are no known global spectrum management schemes with computational analytics across networks employing DSA. While wireless network operators make use of spectrum management within their own networks, there is no cross-network, or cross-operator, spectrum management between potential ASH's. Today, with spectrum exclusively licensed, there has been no push for large scale spectrum management. However, with future spectrum exhaustion of their exclusively-licensed spectrum expected by carriers, the larger pool of rented spectrum provides a greater pool of spectrum resources from which to optimize utilization, i.e., optimization would no longer be limited to just the local spectrum resources of each individual carrier.

An overarching CSS approach to realizing a form of DSA centered on the cloud is proposed in U.S. Provisional Patent Application No. 61/603,261. Specifically, the cloud is envisioned as the mechanism to enable management, in real-time or in near real-time, of the dynamic allocation, reclaiming, de-allocation, auditing, and optimizing the use of spectrum that has been the subject of a transaction between PSH's and operators/users/content providers acting as ASH's.

Application No. PCT/US2012/035780 proposes a two-level spectrum management analytic optimization that effectively bifurcates spectrum optimization requirements and responsibilities between a regional global spectrum broker and local optimization by each operator for its own cellular network. That application specifically discusses a concept of local and global optimization for spectrum management according to a specified brokering scheme.

As an aid to the optimization described in the 780 application, Application No. PCT/US2012/035760 describes inputs, outputs and guidelines of an algorithm used to resolve spectrum optimization at one or both of the global and local spectrum broker levels described in the 780 application. Each of the inputs discussed in the 760 application may be employed to generate appropriate output profiles for multi-mode devices (MMD's), or wireless devices, in support of the DSA. The 760 application specifically describes implementing a spectrum management analytics (SMA) algorithm that references a plurality of enumerated inputs to generate a set of output parameters for use by an MMD in optimizing spectrum use for the spectrum resources made available to that MMD. The SMA algorithm is described as being a part of a cloud spectrum broker (CSB) analytic. The CSB analytic provides for: (1) Managing CSS transactions involving transfer of spectrum resources from participating PSH's to one or more ASH's; (2) Reclaiming spectrum resources from an ASH back to the corresponding PSH on request; (3) Initiating queries to PSH's based on requests from MMD's, or through other ASH's; and (4) Performing a series of predictive resource allocations that may optimize spectrum use as the MMD moves between a number of regions.

The multiple and varied sources of information generally described in the 760 application provide information regarding: a radio interface, MMD capabilities, base station capabilities, information from geographic databases, information from a spectrum availability database (such as a CSD), information from an MMD profile database, and information regarding outstanding requests, which may represent a compilation of application characteristics. MMD mobility models, and information on visible networks.

To realize the CSS approach described in the 261 Provisional application, a cloud spectrum database (CSD) is proposed, with detail provided in related Application No. PCT/US2012/035748, to serve as a dynamic and interactive repository for several of the classes of information discussed in the 760 application associated with a dynamically changing listing of spectrum availabilities. The systems and methods described in the [0068] application implement the CSD by which spectrum availability is defined and cataloged according to individual data elements and offered for transactions with ASH's and MMD's according to a common unit measurement system. In the 748 application disclosure, the defined metric for the disclosed common unit measurement system is referred to as a time-frequency unit or TFU. One TFU may be defined, for example, according to a unit of spectrum being available for a specified time. e.g., 1 MHz of spectrum being available for use for 1 second at a given location. Every spectrum resource negotiated in CSS transactions may be represented (transferred) in multiples of TFU's, each TFU representing a contiguous time by frequency tile.

The 748 application specifies that, in the CSD, spectrum availability may be defined according to a plurality of information entries, including at least a frequency band (band ID), a start frequency and an end frequency. Each entry may also be accompanied by a series of individual parameters that may be used to further describe the spectrum availability in order that an ASH or MMD may make an offer for acquisition of several units of spectrum availability according to the information provided. These individual parameters may include: (1) an indication that the available spectrum is licensed; (2) an indication that the available spectrum is subject to being reclaimed by the PSH that made the spectrum available to the CSD, i.e., subject to preemption by the PSH, with appropriate details of the immediacy, for example, of the recall; (3) a start time of the spectrum availability; (4) an end time of the spectrum availability; (5) a maximum power level that the PSH authorizes to use over this available spectrum; (6) a geographic location regarding this available spectrum; (7) a cost (monetary or other consideration) per TFU, or other appropriate unit price, for use of the available spectrum; and (8) an indication of an identity of an ASH or MMD using a particular portion of the available spectrum based on a transaction such that, in a case that a PSH wants to reclaim the spectrum that it made available, but that is in use, the CSD will facilitate contact with the entity to ensure that the entity's ceases operation in that spectrum.

Wireless telecommunications are supported by different frequency bands across the available spectrum. Generally, these bands may be categorized as International Mobile Telecommunication (IMT) bands, which are the bands that are generally exclusively licensed by the operators of mobile wireless networks, such as mobile cellular networks, within which individual MMD's are configured to operate, and non-IMT bands that are otherwise exclusively licensed by other types and categories of entities generally described as PSH's in this disclosure. There is a process within the International Telecommunication Union for deciding and/or designating IMT bands.

Exemplary embodiments of the disclosed systems and methods may implement dynamic spectrum access with individual MMD's that incorporate multiple radios in a single device.

In exemplary embodiments, an MMD may make use of the incremental spectrum by maintaining a data communication link via a base station that may be operated by a primary operator ASH to support communications in the primary operator ASH's exclusively-licensed spectrum. This data communication link may be maintained by a first radio, the data communication link being used to support a first level of data communication, as well as to signal availability of the incremental band(s) of additional spectrum to the MMD.

In exemplary embodiments, an ASH or MMD may communicate with a cloud entity such as, for example a CSD or CSB to request access to additional spectrum that may be offered by one or more PSH's. A separate authentication procedure may be employed that may be complex, slow, costly or difficult to implement if the MMD employs the first radio, the same radio that maintains ongoing connection with the primary operator ASH. A second radio may facilitate access to the additional spectrum for data communication while maintaining the data communication link with the first radio.

Exemplary embodiments may support scenarios in which incremental dynamic spectrum provided to the MMD by the spectrum marketplace may be more efficiently provided via the second radio. This may represent an improvement over conventional MMD's that employ a single 4G radio for aggregation of multiple frequency bands from the same primary operator ASH, or two radios of different generations, e.g., a 20 radio and a 3G radio, for connections focused separately on voice and data communications. There are currently no dual radio approaches for maintaining separate and optimal data connections.

Exemplary embodiments may use an MMD having a two-radio architecture that is characterized by having a first radio, differentiated in this disclosure as a "baseline" radio, for connection to the primary operator ASH's spectrum, and a second radio that may be of a same or a different configuration, differentiated in this disclosure as a "turbo" radio, that may be designated for dynamic spectrum use.

In exemplary embodiments, the baseline radio may be, for example, one of an existing GSMA, CDMA, WiMAX, or LTE radio. The baseline radio may be used, for example by the primary operator ASH's base station to signal to the MMD what, if any, dynamic spectrum bands to use or to cease using. The baseline radio may also be used, for MMD requested additional spectrum scenarios, as a data communication link to the cloud-based entity, such as a CSD or a CSB, to request incremental spectrum availability.

Exemplary embodiments may provide an MMD in which the turbo radio adjusts a flexible RF frontend in order to tune to the dynamic band(s) signaled by the base station over the baseline radio.

Exemplary embodiments may provide, in a single MMD, a baseline radio and a turbo radio that may be operated in a coordinated or an uncoordinated manner. In a coordinated operating scheme, the baseline radio and the turbo radio may be supported by a same common baseband processor. In an uncoordinated operating scheme, each of the baseline radio and the turbo radio may be supported by separate baseband processors. As part of the protocol signaling between the MMD and the primary operator ASH's base station supporting the MMD, a given operating scheme or mode may be selected before engaging the turbo radio for use. The choice of a given operating scheme or mode may depend on a number of factors. These factors may include cost, power, traffic and performance considerations. For example, the uncoordinated scheme may support improved performance as both radios are free to operate simultaneously and with separate baseband processors. This advantage may come at the expenses of higher power consumption and cost. Conversely, a coordinated scheme may allow separate data streams to be combined in a common baseband processor, which may be harder to accomplish in an uncoordinated scheme.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods that implement dynamic band access using an MMD containing multiple radios that provide access to spectrum allocated by PSH's in a spectrum management scheme will be described, in detail, with reference to the following drawings, in which.

DETAILED DESCRIPTION OF THE DISCLOSED EMBODIMENTS

The systems and methods that implement dynamic band access using an MMD containing multiple radios that provide access to spectrum allocated by PSH's will generally refer to this specific utility for those systems and methods. Exemplary embodiments described and depicted in this disclosure should not be interpreted as being specifically limited to particular communication paths or particular frequency bands, or to specific system infrastructures for exchanging information with PSH's, ASH's or MMD's, except that at least some of the elements of the disclosed systems, and methods for using those systems, may communicate with cloud based elements for implementing spectrum optimization and for delivering dynamic spectrum according to requests from an MMD or a primary operator ASH within which the MMD operates.

While reference will appear to be directed, throughout this disclosure, to the disclosed and depicted MMD's operating in communication with a primary operator ASH in a conventionally understood "controlled market" method for providing wireless communication services, it should be understood that the systems and methods according to this disclosure are not limited to the conventionally understood "controlled market" method. The disclosed concepts may be equally applicable to any method for providing wireless data communication services through direct interaction with individual MMD's when such a method becomes feasibly implemented for the control of wireless data communication. The discussion references application to the "controlled market" method only for familiarity and ease of understanding of the proposed implementation based on the currently-understood protocols for implementing commercial wireless (cellular) communication via a primary operator ASH.

Specific reference to, for example, to the particularly described and depicted MMD configurations, as well as the references to wireless (mobile cellular) network configurations should be understood as being exemplary only, and not limited, in any manner, to any particular class of MMD's or other wireless devices used in any particular configuration of a wireless network, whether fixed or mobile, or as autonomous units capable of executing transactions for available spectrum directly with cloud-based elements.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific exemplary implementations are discussed, it should be understood that this is done for illustration purposes only. A person skilled in the relevant art will recognize that other components and configurations may be used without departing from the spirit and scope of the subject matter of this disclosure.

In attempting to optimize spectrum use in a particular geographic region, there are a large number of inputs that may be considered. These inputs include time-based, location-based and frequency-based parameters. Information collected and stored, for example, in a CSD is intended to capture a plurality of these parameters to describe spectrum availability in a single location as part of a cloud-based spectrum marketplace. With implementation of such a marketplace, PSH's who know how often, how much, and generally at what times, they employ the spectrum exclusively licensed to them, may populate the CSD with information appropriate to catalog their proposed spectrum availability. PSH's may indicate periods when their spectrum is available, in order that potential primary operator ASH's, as entities that require or desire additional spectrum services, perhaps at specific times in specific locations, may enter into a transaction based on the listed periods of spectrum availability provided to the marketplace via the CSD.

The availability of spectrum to a spectrum marketplace will sometimes be subject to a PSH's ability to reclaim that spectrum on demand, preempting the use of the spectrum by an MMD. This disclosure will interchangeably refer to such an occurrence as reclaiming or preempting spectrum use. This capacity is part of the system that implements the cloud-based marketplace scheme. This requirement, and the level of uncertainty that it introduces, may also drive the amount of a fee, or other consideration, that the primary operator ASH may be willing to offer for the spectrum availability. If, for example, it is more unlikely than likely that the spectrum will need to be reclaimed immediately in, for example, a peak period for operations by the primary operator ASH, that spectrum may garner a higher cost per TFU than spectrum that may be immediately recallable and is likely to be recalled on some routine basis.

Figure 1:
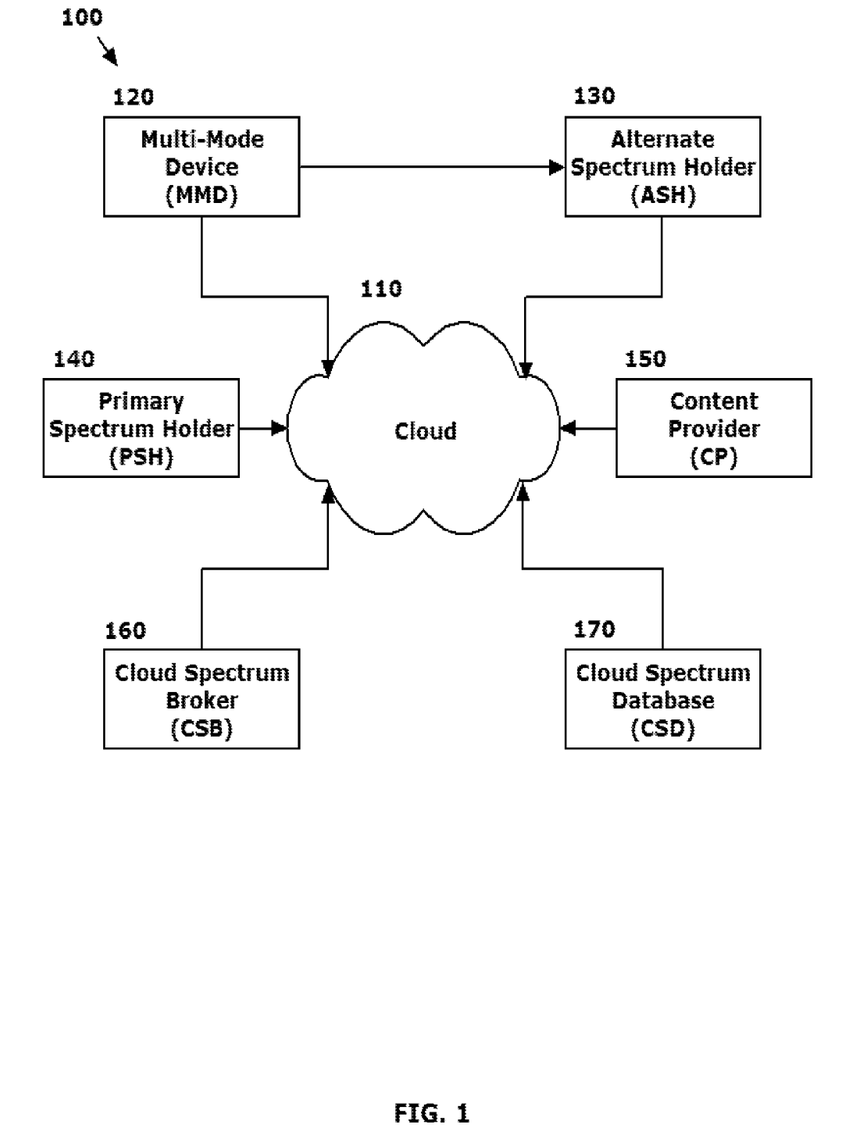
FIG. 1 illustrates an exemplary overview of connectivity to the cloud for individual entities involved in the CSS scheme according to this disclosure.

FIG. 1 illustrates an exemplary overview 100 of connectivity to the cloud 110 for individual entities involved in the CSS architecture. As shown in FIG. 1, the individual entities may include: one or more multi-mode devices (MMD's) 120 communicating directly with other of the entities via the cloud 110, or otherwise through an primary operator alternate spectrum holder (ASH) 130 with which the one or more MMD's 120 are in communication; one or more primary spectrum holders (PSH's) 140; one or more content providers (CP's) 150: at least one regional cloud spectrum broker (CSB) 160: and a generally regional cloud spectrum database (CSD) 170. Although depicted as separate elements in FIG. 1, one or more of the elements representing the individual entities 120-170 may actually be resident in the cloud 110. This may be particularly the situation with the CSD 170.

Implementation of the spectrum management schemes discussed above involves exchange of certain data between PSH's and ASH's and/or MMD's. Spectrum accessibility may be exchanged based on requests from MMD's via their primary operator ASH. Spectrum availability may be specified according to a plurality of defining parameters. The defining parameters may include, for example, identification of a frequency band, and/or separate identification of a start frequency and an end frequency, which may be used cooperatively or independently to define the frequency of the spectrum availability provided by the PSH. The provided frequency band may be one or more non-IMT bands. Typically, MMD's operate only in IMT bands. Conventionally, a capacity exists to aggregate IMT-band communication across multiple IMT bands to the beneficial use of one or more MMD's. A capacity to aggregate non-IMT bands to this use does not exist.

An individual MMD, or a primary operator ASH operating a base station with which a number of MMD's operate, may advise the other elements of CSS architecture of its capabilities, in the form of an MMD profile for the individual MMD or multiple MMD's. This profile information, provided for the consideration of a cloud-based entity, such as a CSB or a CSD, to allocate spectrum, or for a PSH to direct its advertising to a targeted market, may include an indication of the capacity of an individual MMD and a base station to support signaling by which multiple frequency bands, including IMT bands and non-IMT bands, may be aggregated. In this manner, the capacity of a particular MMD, or group of MMD's, to support specific levels of aggregation may provide appropriate insight to the spectrum marketplace to facilitate optimization of spectrum resources.

The PSH may designate a start time and an end time, which taken together specify an "availability window" for the particular spectrum availability. The definition of an availability window will aid a primary operator ASH or MMD in determining whether a particular offered spectrum availability meets the requirements of the ASH or MMD. When taken in combination with definition of details regarding potential preemption, the availability window provides a best guess by the PSH regarding its ability to provide uninterrupted spectrum availability.

As indicated above, spectrum availability may be subject to being reclaimed by the offering PSH at any time by, for example, the PSH sending a "STOP" or "STOP <time>" message. The "STOP" or "STOP <time>" message may be the mechanism used by the PSH to reclaim spectrum previously made available to the CSD and/or the CSB when a need arises within a particular availability window. When circumstances arise that require the PSH to reclaim the use of its spectrum, the CSD and/or the CSB may notify the associated primary operator ASH or MMD using the procured in-use spectrum to discontinue use of the reclaimed spectrum immediately in the case of a "STOP" message, or no later than the value indicated by the <time> parameter of the "STOP <time> message. The CSD and/or the CSB thereby may cause information to be transmitted to the controlling primary operator ASH, or directly to a using MMD, to cease use of the in-use spectrum made available by the PSH.

The PSH may also define a particular cost per spectrum unit, specified in this disclosure with reference to TFU's to provide a common framework for the discussion. It should be understood that other metrics may be used in place of a TFU, and that "cost" may be met according to monetary compensation or other considerations.

Because certain elements of the above information may change very dynamically, each of the entities involved in the transaction communication process described above should be responsive to these dynamic changes in the information provided. An ability to keep pace with the rapidly changing landscape of the marketplace may define a requirement for a fully automated computation engine as a CSB, or to appropriately support and employ the CSD, in a manner that accounts for the dynamically changing conditions regarding any of the specified parameters on a real-time or near real-time basis.

Figure 2:
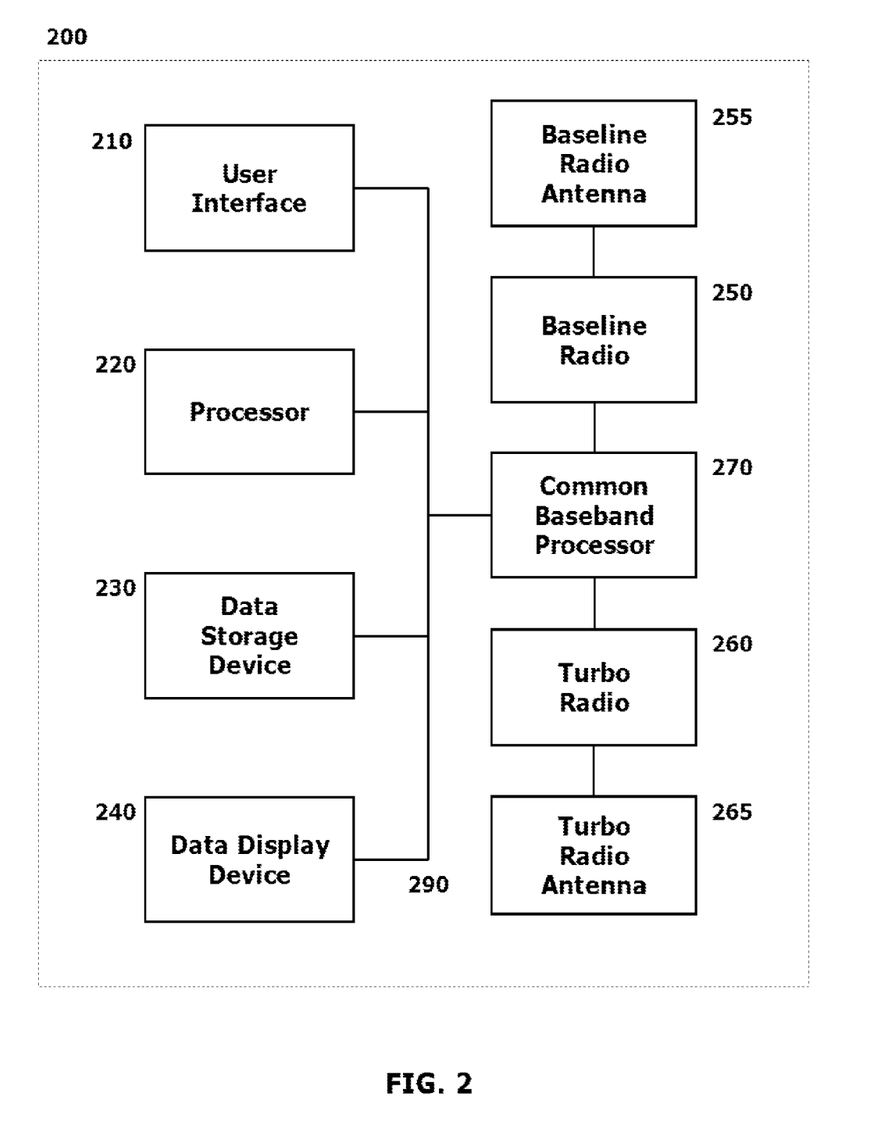
FIG. 2 illustrates a block diagram of a first exemplary configuration for an MMD according to this disclosure.

FIG. 2 illustrates a block diagram of a first exemplary configuration for an MMD 200 according to this disclosure. The exemplary MMD 200 includes multiple radios to facilitate communications on multiple frequency bands facilitating the implementation of a spectrum optimization plan, as described above. The exemplary MMD 200 may include a first radio, referred to in FIG. 2 as baseline radio 250, which may include a baseline radio antenna 255, and a second radio, referred to in FIG. 2 as turbo radio 260, which may include a turbo radio antenna 265.

The baseline radio 250 is the primary radio by which the exemplary MMD 200, having a multi-radio capability, may maintain data communications via a base station operated by an ASH as a primary operator of the wireless network within which the exemplary MMD 200 operates. In this manner, the baseline radio 250 may access wireless data content via the primary operator ASH's exclusively-licensed spectrum. Based on information provided by the baseline radio 250, including requests to undertake certain applications, the primary operator ASH may determine a need at a particular time to request access to additional spectrum from a spectrum marketplace in the geographic region within which the exemplary MMD 200 is operating. The exemplary MMD 200 may be informed of available access to additional spectrum via its data communications with the base station. Upon receiving an indication of access to additional spectrum, the baseline radio 250 may signal other components in the exemplary MMD 200 to activate the turbo radio 260.

Once activated, the turbo radio 260 may receive from the baseline radio 250 information forwarded by entities comprising the spectrum marketplace regarding frequency-based and time-based characteristics of the additional spectrum. The turbo radio 260 may then be automatically tuned to an appropriate frequency to commence data communication via the provided additional spectrum. In this manner, the turbo radio 260 may operate in parallel with the baseline radio 250 to facilitate access to the additional spectrum, while the baseline radio 250 may maintain its previous data communications via the base station operated by the primary operator ASH. Under such parallel operations, incremental dynamic spectrum access may be provided to the exemplary MMD 200 in a more efficient manner than if the baseline radio 250 was tasked with conducting simultaneous data communication across the different frequency bands represented by the band with which the baseline radio normally operates, and some attempt at aggregation of the frequency band identified for the provided additional spectrum.

In instances when a PSH that made the additional spectrum available to the spectrum marketplace forwards an indication that the PSH requests to reclaim the provided additional spectrum in the designated availability window, this indication may be received in the exemplary MMD 200 by communication with the baseline radio 250. The baseline radio 250 may then signal the turbo radio 260 to cease conducting data communication across the additional spectrum. Once the turbo radio 260 ceases conducting the data communication across the additional spectrum, the baseline radio 250 may inform other entities in the spectrum marketplace that data communication for the exemplary MMD 200 in the additional spectrum has ceased. Separately, the baseline radio 250 may internally signal to turn off the turbo radio 260. According to another embodiment, communication via the baseline radio 250 may be interrupted in during periods of operation of the turbo radio 260. In this embodiment, when the PSH that made the additional spectrum available to the spectrum marketplace forwards the indication that the PSH requests to reclaim the provided additional spectrum in the designated availability window, this indication may be received in the exemplary MMD 200 by communication with the turbo radio 260. The turbo radio 260 may then signal the baseline radio 250 to re-establish conduct of data communication. Once the turbo radio 260 ceases conducting the data communication across the additional spectrum, the baseline radio 250 may inform other entities in the spectrum marketplace that data communication for the exemplary MMD 200 in the additional spectrum has ceased.

As shown in FIG. 2, the individual RF radios, i.e., the baseline radio 250 and the turbo radio 260, may operate in conjunction with the single baseband processor 270. In this regard, a signal from separate RF radios may be combined in the digital portion represented by the single baseband processor 270. Such a configuration may limit cost and power requirements for the exemplary MMD 200. A trade-off may be, however, that the overall efficiency of separate communications, as they are processed by a single baseband processor 270, may be reduced. Operations by multiple RF radios in the manner described here regarding the single baseband processor 270 are termed "coordinated" operations.

The exemplary MMD 200 may include a user interface 210 by which a user interacts with the exemplary MMD 200. The user interface 210 may be configured as one or more conventional mechanisms that permit the user to input information to the exemplary MMD 200, including a keyboard, keypad or touchscreen.

The exemplary MMD 200 may include a processor 220 for individually undertaking the processing and control functions of the exemplary MMD 200. The processor 220 may be in the form of a conventional microprocessor that interprets and executes instructions and processes data, incoming for, and outgoing from, the exemplary MMD 200.

The exemplary MMD 200 may include a data storage device 230. Such data storage device 230 may be used to store data, and operating programs or applications to be used by the exemplary MMD 200, and specifically by the processor 220. Data storage device 230 may include a random access memory (RAM) or another type of dynamic storage device that stores information and instructions for execution by the processor 220. Data storage device 230 may also include a read-only memory (ROM), which may include a conventional ROM device or another type of static storage device that stores static information and instructions for execution by the processor 220. The data storage device 230 according to this disclosure is a data storage device that is integral to the exemplary MMD 200.

The exemplary MMD 200 may include at least one data display device 240 by which information regarding the status of the exemplary MMD 200, and operations undertaken by the exemplary MMD 200, may be displayed to a user. The data display device 240 may be configured as one or more conventional mechanisms that display information to a user of the exemplary MMD 200.

All of the various components of the exemplary MMD 200, as depicted in FIG. 2, may be connected by an internal data/control bus 290. The data/control bus 290 may provide internal wired communication between the various components of the exemplary MMD 200.

It is anticipated that the various disclosed elements of the exemplary MMD 200 may be arranged in combinations of sub-systems as individual components or combinations of components, integral to the exemplary MMD 200. This does not preclude, however, a configuration in which, for example, a separate data storage device may be located remotely from, and in wireless communication with, the exemplary MMD 200.

Figure 3:
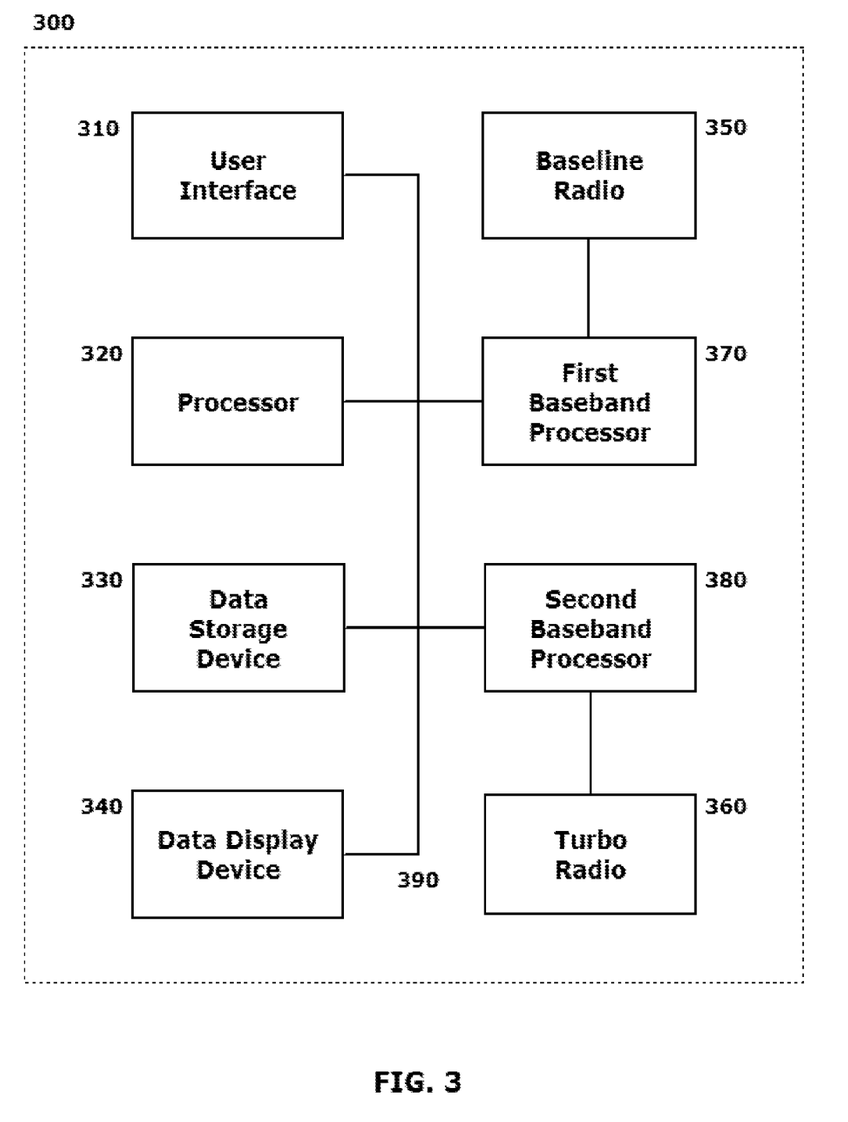
FIG. 3 illustrates a block diagram of a second exemplary configuration for an MMD according to this disclosure.

FIG. 3 illustrates a block diagram of a second exemplary configuration for an MMD 300 according to this disclosure. The exemplary MMD 300 includes the same types of multiple radios to facilitate communications on multiple frequency bands for the implementation of a spectrum optimization plan, as described above, and as shown in FIG. 2. The exemplary MMD 310 may include a first radio, baseline radio 350, and a second radio, turbo radio 360.

It should be noted that all of the individual components, including the user interface 310, the processor 320, the data storage device 330, the data display device 340, and the data/control bus 390 may be in accordance with the descriptions of the comparable components in FIG. 2 discussed above.

As shown in FIG. 3, the individual RF radios, i.e., the baseline radio 350 and the turbo radio 360, may operate in conjunction with individual first and second broadband processors 370,380. In this regard, signals from separate RF radios may flow separately through the digital portion of the exemplary MMD 300 represented by the individual first and second baseband processors 370,380. Such a configuration may increase cost and power requirements for the exemplary MMD 300. A trade-off may be, however, that the overall efficiency of the separate communications, as they are processed by the multiple individual first and second baseband processors 370,380, may be increased. Operations by multiple RF radios in the manner described here regarding the multiple individual first and second baseband processors 370,380 are termed "uncoordinated" operations.

Figure 4:
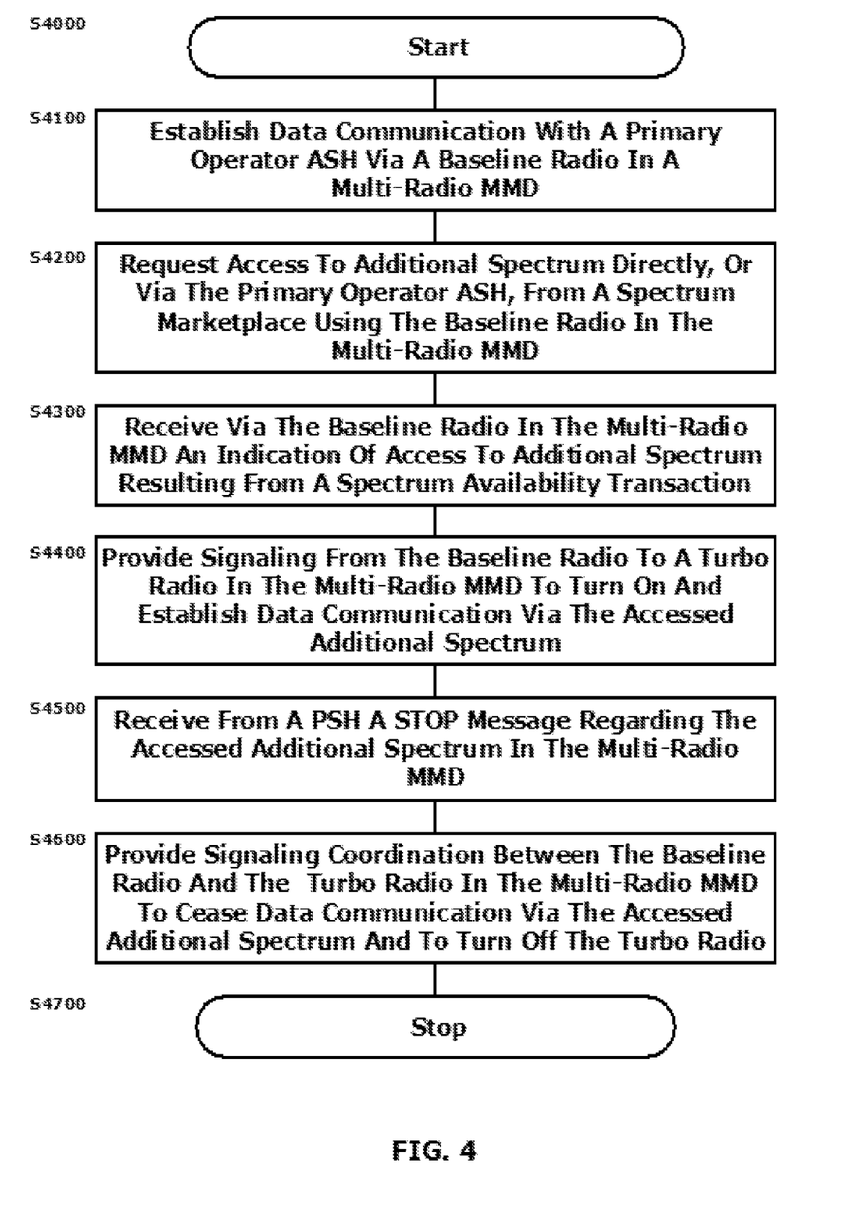
FIG. 4 illustrates a flowchart of an exemplary method for operating an MMD according to this disclosure.

FIG. 4 illustrates a flowchart of an exemplary method for operating an MMD according to this disclosure. As shown in FIG. 4, operation of the method commences at Step S4000 and proceeds to Step S4100.

In Step S4100, data communication may be established with a primary operator ASH via a baseline radio in a multi-radio MMD. Operation of the method proceeds to Step S4200.

In Step S4200, a request to access additional spectrum directly, or via the primary operator ASH, may be forwarded as a data communication to a spectrum marketplace, as discussed above, using the baseline radio in the multi-radio MMD. Operation of the method proceeds to Step S4300.

In Step S4300, an indication may be received via the baseline radio in the multi-radio MMD of additional spectrum made available to the multi-radio MMD for data communication as a result of a spectrum availability transaction in the spectrum marketplace. Operation of the method proceeds to Step S4400.

In Step S4400, signaling may be transmitted from the baseline radio to a second radio, referred to as a turbo radio, in the multi-radio MMD to turn on the turbo radio and to establish, with the turbo radio, data communication according to the indicated spectrum availability. The data communication by the turbo radio may be according to individual spectrum characteristics provided to the spectrum marketplace by a providing PSI. Operation of the method proceeds to Step S4500.

In Step S4500, the providing PSH may send a "STOP" or "STOP <time>" message regarding the provided access to additional spectrum that may be received via the baseline radio or the turbo radio in the multi-radio MMD. The "STOP" or "STOP <time>" message effectively modifies the end time of any availability window that the PSH provided for the additional spectrum. Operation of the method proceeds to Step S4600.

In Step S4600, the baseline radio and the turbo radio may then coordinate operations to cease data communication via the accessed additional spectrum. The baseline radio may also signal to the turbo radio to turn off for power savings when data communication is not being undertaken by the turbo radio. Operation of the method proceeds to Step S4700, where operation of the method ceases.

The disclosed embodiments may include a non-transitory computer-readable medium storing instructions which, when executed by a processor in a multi-radio MMD, may cause the multi-radio MMD to execute all or some of the steps of a method as outlined above.

The above-described exemplary systems and methods reference certain conventional terms and components to provide a brief, general description of a suitable communication and processing environment in which the subject matter of this disclosure may be implemented in a multi-radio MMD for familiarity and ease of understanding. Although not required, embodiments of the systems and methods according to this disclosure may be provided, at least in part, in a form of hardware circuits, firmware or software computer-executable instructions to carry out the specific functions described, including program modules, being executed by a processor. It should also be understood that certain of the functions described above may be carried out by virtual logical elements that may be cloud-based. Generally, program modules include routine programs, objects, components, data structures, and the like that perform particular tasks or implement particular data types.

Those skilled in the art will appreciate that other embodiments of the disclosed subject matter may be practiced with many types of individual MMD's.

Embodiments include reference to functions that may be practiced in distributed network and/or cloud-based communication/computing environments where tasks are performed by local and remote processing devices that are linked to each other by hardwired links, wireless links or a combination of both through a communication network. In a distributed network environment, program modules may be located in local, remote and virtual logical cloud-based data storage devices.

Embodiments within the scope of this disclosure may also include non-transitory computer-readable media having stored computer-executable instructions or data structures that can be accessed, read and executed by a processor in, for example, a multi-radio MMD.

The exemplary depicted sequence of executable instructions, or associated data structures for executing those instructions, represents only one example of a corresponding sequence of acts for implementing the functions described in the method. The steps of the method, as depicted and described, are not intended to imply any particular order to the depicted steps, except as may be necessarily inferred when one of the depicted steps is a necessary precedential condition to accomplishing another of the depicted steps. Many of the operations and functions described may occur in parallel.

Although the above description may contain specific details, they should not be construed as limiting the claims in any way. Other configurations of the described embodiments of the disclosed systems and methods are part of the scope of this disclosure. This enables each user to use the benefits of the disclosure even if any one of a large number of possible applications, for example, being accessed by any particular MMD, do not need a specific aspect of the functionality described and depicted in this disclosure. In other words, there may be multiple instances of the components, particularly individual MMD's, each processing the content in various possible ways. It does not necessarily need to be one system used by all end users. Accordingly, the appended claims and their legal equivalents should only define the disclosure, rather than any specific examples given.

We claim:

1. A multi-radio multi-mode device for implementing dynamic spectrum access, comprising:
    a first radio in the multi-radio multi-mode device that is configured to (1) establish a first data communication link with a base station, (2) request additional spectrum access from a spectrum marketplace, and (3) receive from the spectrum marketplace an indication of access to additional spectrum;
    wherein the first data communication link is used to support a first level of data communication and to signal availability of incremental band of additional spectrum;
    a second radio in the multi-radio multi-mode device that is configured to (1) receive a signal to turn on from the first radio, (2) turn on based on the received signal, and (3) establish second data communication within the received access to the additional spectrum;
    wherein the first radio signaling the second radio to cease data communication within the received access to the additional spectrum before the expiration of the time parameter;
    a single baseband processor that converts the first data communication and the second data communication respectively from the first radio and the second radio to digital data;
    a second baseband processor that separately and respectively convert the first data communication and the second data communication from the first radio and the second radio to digital data.

2. The device of claim 1, the indication of the access to the additional spectrum including one or more characteristics provided to the spectrum marketplace by an exclusive licensee of the additional spectrum, the first radio receiving the one or more characteristics and signaling them to the second radio when the second radio turns on, and the second radio establishing the second data communication using the one or more characteristics.

3. The device of claim 2, the one or more characteristics including at least a start time and an end time for access to the available spectrum.

4. The device of claim 3, the first radio further receiving a request from the exclusive licensee of the additional spectrum to reclaim the additional spectrum, and signaling the second radio to cease data communication within the received access to the additional spectrum.

5. The device of claim 4, the first radio signaling the second radio to turn off.

6. The device of claim 4, the request from the exclusive licensee of the additional spectrum to reclaim the additional spectrum including the time parameter by which the exclusive licensee wants use of the additional spectrum to cease.

7. A system for implementing dynamic spectrum access, comprising:
    a first radio that is configured to (1) establish a first data communication link with a base station, (2) request additional spectrum access from a spectrum marketplace, and (3) receive from the spectrum marketplace an indication of access to additional spectrum; a first radio antenna;
    wherein the first data communication link is used to support a first level of data communication and to signal availability of incremental band of additional spectrum;
    a second radio that is configured to (1) receive a signal to turn on from the first radio, (2) turn on based on the received signal, and (3) establish second data communication within the received access to the additional spectrum; and a second radio antenna;
    the first radio signaling the second radio to cease data communication within the received access to the additional spectrum before the expiration of a time parameter;

a single baseband processor that converts the first data communication and the second data communication respectively from the first radio and the second radio to digital data.

8. The system of claim 7, the indication of the access to the additional spectrum including one or more characteristics provided to the spectrum marketplace by an exclusive licensee of the additional spectrum, the first radio receiving the one or more characteristics via the first radio antenna and signaling them to the second radio when the second radio turns on, and the second radio establishing the second data communication via the second radio antenna using the one or more characteristics.

9. The system of claim 8, the one or more characteristics including at least a start time and an end time for access to the available spectrum.

10. The system of claim 9, the first radio further receiving a request from the exclusive licensee of the additional spectrum to reclaim the additional spectrum, and signaling the second radio to cease data communication within the received access to the additional spectrum.

11. The system of claim 10, the first radio signaling the second radio to turn off.

12. The system of claim 11, the request from the exclusive licensee of the additional spectrum to reclaim the additional spectrum including the time parameter by which the exclusive licensee wants use of the additional spectrum to cease.

13. The system of claim 7, further comprising a second baseband processor that separately and respectively convert the first data communication and the second data communication from the first radio and the second radio to digital data.

14. A method for implementing dynamic spectrum access using a multi-radio multi-mode device, comprising:
establishing first data communication with a base station using a first radio in a multi-radio multi-mode device;
requesting additional spectrum access using the first radio in the multi-radio multi-mode device;
wherein the first data communication link is used to support a first level of data communication and to signal availability of incremental band of additional spectrum;
receiving from a spectrum marketplace an indication of access to additional spectrum via the first radio;
signaling by the first radio to a second radio in the multi-radio multi-mode device to turn on based on the receiving of the access to the additional spectrum; and
establishing second data communication within the received access to the additional spectrum using the second radio;
wherein the first radio signaling the second radio to cease data communication within the received access to the additional spectrum before the expiration of a time parameter;
wherein the first radio and the second radio operating with a single baseband processor in the multi-radio multi-mode device.

15. The method of claim 14, the indication of the access to the additional spectrum including one or more characteristics provided to the spectrum marketplace by an exclusive licensee of the additional spectrum.

16. The method of claim 15, the second data communication being established using the one or more characteristics.

17. The method of claim 16, the one or more characteristics including at least a start time and an end time for access to the available spectrum.

18. The method of claim 17, further comprising receiving via the first radio a request from the exclusive licensee of the additional spectrum to reclaim the additional spectrum.

19. The method of claim 18, the first radio signaling the second radio to cease data communication within the received access to the additional spectrum.

20. The method of claim 19, the first radio signaling the second radio to turn off.

21. The method of claim 18, the request from the exclusive licensee of the additional spectrum to reclaim the additional spectrum including the time parameter by which the exclusive licensee wants access to the additional spectrum to cease.

22. A non-transitory computer-readable medium storing computer-readable instructions which, when executed by a processor, causes the processor to execute a method for implementing dynamic spectrum access, the method comprising:
establishing first data communication with a base station using a first radio in a multi-radio multi-mode device;
wherein the first data communication is used to support a first level of data communication and to signal availability of incremental band of additional spectrum;
requesting additional spectrum access using the first radio in the multi-radio multi-mode device;
receiving from a spectrum marketplace an indication of access to additional spectrum via the first radio;
signaling by the first radio to a second radio in the multi-radio multi-mode device to turn on based on the receiving of the access to the additional spectrum; and
establishing second data communication within the received access to the additional spectrum using the second radio;
wherein the first radio signaling the second radio to cease data communication within the received access to the additional spectrum before the expiration of a time parameter;
wherein the first radio and the second the operating with a single baseband processor in the multi-radio multi-mode device.

23. The non-transitory computer-readable medium of claim 22, the second data communication being established using the one or more characteristics.

24. The non-transitory computer-readable medium of claim 23, the one or more characteristics including at least a start time and an end time for access to the available spectrum.

25. The non-transitory computer-readable medium of claim 24, further comprising receiving via the first radio a request from the exclusive licensee of the additional spectrum to reclaim the additional spectrum.

26. The non-transitory computer-readable medium of claim 25, the first radio signaling the second radio to cease data communication within the received access to the additional spectrum.

27. The non-transitory computer-readable medium of claim 26, the first radio signaling the second radio to turn off.

28. The non-transitory computer-readable medium of claim 25, the request from the exclusive licensee of the additional spectrum to reclaim the additional spectrum including the time parameter by which the exclusive licensee wants access to the additional spectrum to cease.

29. The non-transitory computer-readable medium of claim 22, the first radio and the second the operating respectively with a first baseband processor and a separate second baseband processor in the multi-radio multi-mode device.

* * * * *

UNITED STATES PATENT AND TRADEMARK OFFICE
CERTIFICATE OF CORRECTION

Page 1 of 1

PATENT NO. : 9,648,589 B2
APPLICATION NO. : 13/996682
DATED : May 9, 2017
INVENTOR(S) : Geoff Weaver et al.

It is certified that error appears in the above-identified patent and that said Letters Patent is hereby corrected as shown below:

On the Title Page

Column 1, under Prior Publication Data, insert -- Related U.S. Application Data Claims Priority from Provisional Application Ser. No. 61/603,261 filed on Apr. 11, 2012 --.

Column 2, under (74) Attorney, Agent or Firm, delete "Ellis B. Ramirez; PRASS LLP" and insert -- Patent Capital Group --, therefor.

In the Specification

Column 1, Line 8, delete "Usage." and insert -- Usage, --, therefor.

Column 1, Line 10, delete "035780." and insert -- 035780, --, therefor.

Signed and Sealed this
Eleventh Day of July, 2017

Joseph Matal
*Performing the Functions and Duties of the
Under Secretary of Commerce for Intellectual Property and
Director of the United States Patent and Trademark Office*